US009658754B2

(12) United States Patent
Lanahan et al.

(10) Patent No.: US 9,658,754 B2
(45) Date of Patent: May 23, 2017

(54) MULTI-DIRECTIONAL AND VARIABLE SPEED NAVIGATION OF COLLAGE MULTI-MEDIA

(71) Applicant: eBay Inc., San Jose, CA (US)

(72) Inventors: James W. Lanahan, Palo Alto, CA (US); Dane M. Howard, Los Gatos, CA (US); Brian F. Williams, San Carlos, CA (US)

(73) Assignee: EBAY INC., San Jose, CA (US)

( * ) Notice: Subject to any disclaimer, the term of this patent is extended or adjusted under 35 U.S.C. 154(b) by 77 days.

(21) Appl. No.: 14/547,083

(22) Filed: Nov. 18, 2014

(65) Prior Publication Data
US 2015/0074502 A1 Mar. 12, 2015

Related U.S. Application Data

(63) Continuation of application No. 12/495,684, filed on Jun. 30, 2009, now Pat. No. 8,893,015, which is a continuation of application No. 12/347,829, filed on Dec. 31, 2008, now Pat. No. 8,365,092.

(60) Provisional application No. 61/078,288, filed on Jul. 3, 2008.

(51) Int. Cl.
| G06F 3/00 | (2006.01) |
| G06F 3/0484 | (2013.01) |
| G06F 17/24 | (2006.01) |
| G06F 17/30 | (2006.01) |

(Continued)

(52) U.S. Cl.
CPC ........ *G06F 3/04842* (2013.01); *G06F 3/0482* (2013.01); *G06F 17/241* (2013.01); *G06F 17/30011* (2013.01); *G06F 17/30056* (2013.01); *G06F 17/30058* (2013.01); *H04L 67/02* (2013.01)

(58) Field of Classification Search
CPC ............. G06F 3/0482; G06F 17/30056; G06F 17/30058; G06F 2213/0062; H04L 67/02; H04L 45/125; H04L 47/528
See application file for complete search history.

(56) References Cited

U.S. PATENT DOCUMENTS

| 6,259,457 B1 * | 7/2001 | Davies ................... G06T 11/00 345/629 |
| 6,470,100 B2 | 10/2002 | Horiuchi |
| 7,023,452 B2 | 4/2006 | Oshiyama et al. |

(Continued)

Primary Examiner — Dino Kujundzic

(57) ABSTRACT

In accordance with one or more embodiments of the present disclosure, methods and apparatus are provided for flexible and user-friendly navigation of loaded media in a multi-media presentation, such that a user may be able to view and/or edit the presentation. In one embodiment, a method for navigating loaded media comprises loading a page of a collage document to a client device, the page having a plurality of layers with each layer being associated with a media object. The method further includes creating a list of layers of the loaded page, each layer indexed by at least a position in the collage document; navigating the collage document in at least one direction and at at least one speed based on user input; and filtering the list of layers based on at least the position in the collage document and a visual window of a user interface to display visible layers of the page within the visual window. A client device for navigating loaded media is also disclosed.

16 Claims, 9 Drawing Sheets

(51) Int. Cl.
*G06F 3/0482* (2013.01)
*H04L 29/08* (2006.01)

(56) References Cited

U.S. PATENT DOCUMENTS

| | | | |
|---|---|---|---|
| 7,546,554 | B2 | 6/2009 | Chiu et al. |
| 7,573,486 | B2 * | 8/2009 | Mondry ............... G06T 11/60 345/619 |
| 7,576,555 | B2 | 8/2009 | Hashimoto |
| 7,576,755 | B2 * | 8/2009 | Sun .................... G06T 11/60 345/629 |
| 8,006,192 | B1 | 8/2011 | Reid et al. |
| 8,024,658 | B1 | 9/2011 | Fagans et al. |
| 8,789,094 | B1 * | 7/2014 | Singh ................... G06F 3/00 348/14.01 |
| 2001/0034740 | A1 | 10/2001 | Kerne |
| 2001/0044835 | A1 * | 11/2001 | Schober ............... G06F 8/60 709/217 |
| 2004/0083080 | A1 | 4/2004 | Reghetti et al. |
| 2005/0114754 | A1 | 5/2005 | Miller et al. |
| 2005/0237952 | A1 * | 10/2005 | Punj ................. H04L 12/1813 370/260 |
| 2006/0070005 | A1 | 3/2006 | Gilbert et al. |
| 2006/0206811 | A1 | 9/2006 | Dowdy |
| 2006/0256739 | A1 | 11/2006 | Seier et al. |
| 2007/0074110 | A1 | 3/2007 | Miksovsky et al. |
| 2007/0186182 | A1 * | 8/2007 | Schiller ........... G06F 17/30899 715/781 |
| 2007/0253028 | A1 | 11/2007 | Widdowson |
| 2008/0027798 | A1 | 1/2008 | Ramamurthi et al. |
| 2008/0134018 | A1 | 6/2008 | Kembel et al. |
| 2008/0215985 | A1 | 9/2008 | Batchelder et al. |
| 2008/0222560 | A1 | 9/2008 | Harrison |
| 2008/0301546 | A1 | 12/2008 | Moore et al. |

\* cited by examiner

MULTI-DIRECTIONAL AND VARIABLE SPEED NAVIGATION OF COLLAGE MULTI-MEDIA

CROSS-REFERENCE TO RELATED APPLICATIONS

This application is a continuation of U.S. patent application Ser. No. 12/495,684, now issued U.S. Pat. No. 8,893,015, filed Jun. 30, 2009, and a continuation-in-part of U.S. patent application Ser. No. 12/347,829, now issued U.S. Pat. No. 8,365,092, filed Dec. 31, 2008, which claims priority to U.S. Patent Application No. 61/078,288 filed Jul. 3, 2008, all of which are incorporated by reference herein in their entireties.

This application is related to pending U.S. patent application Ser. No. 12/347,638, filed Dec. 31, 2008, U.S. patent application Ser. No. 12/347,747, filed Dec. 31, 2008, and U.S. patent application Ser. No. 12/347,749, now issued U.S. Pat. No. 8,627,192, filed Dec. 31, 2008, the contents of which are incorporated by reference herein in their entirety.

BACKGROUND

Technical Field

The present invention generally relates to network-based multi-media presentations and more particularly to navigation of media in such a multi-media presentation on a client device.

Related Art

Presently, when creating and posting online media presentations, a user must typically purchase conventional media presentation software, which may be expensive, create a media presentation with the conventional media presentation software, which is often time consuming, upload the file for the media presentation, and then post a link to a file for online access to the created media presentation, which may require security features. To view the media presentation, another user must access the site storing the file, pass some form of access security features, download the file from the communication network, and have the same software that created the file for viewing. However, this sequence of creating and downloading the media presentation is often expensive, time-consuming, and inconvenient for each user involved in the process. As such, there exists a need to simplify the process of creating and viewing online media presentations over a communication network.

Furthermore, once the media presentation is created and saved, a user must be able to access, view, and/or edit the presentation over a network, which can require large amounts of bandwidth and time if done inefficiently, and in particular when dealing with large amounts of media objects. Thus, methods and apparatus for efficiently and effectively navigating media in a media presentation delivered over a network is desirable.

SUMMARY

In accordance with one or more embodiments of the present disclosure, methods and apparatus are provided for flexible and user-friendly navigation of loaded media in a multi-media presentation, such that a user may be able to view and/or edit the presentation.

In one embodiment, a method for navigating loaded media comprises loading a page of a collage document to a client device, the page having a plurality of layers with each layer being associated with a media object. The method further includes creating a list of layers of the loaded page, each layer indexed by at least a position in the collage document; navigating the collage document in at least one direction and at at least one speed based on user input; and filtering the list of layers based on at least the position in the collage document and a visual window of a user interface to display visible layers of the page within the visual window. A client device for navigating loaded media is also disclosed.

These and other features of the present disclosure will be more readily apparent from the detailed description of the embodiments set forth below taken in conjunction with the accompanying drawings which are described below.

Figure 1:
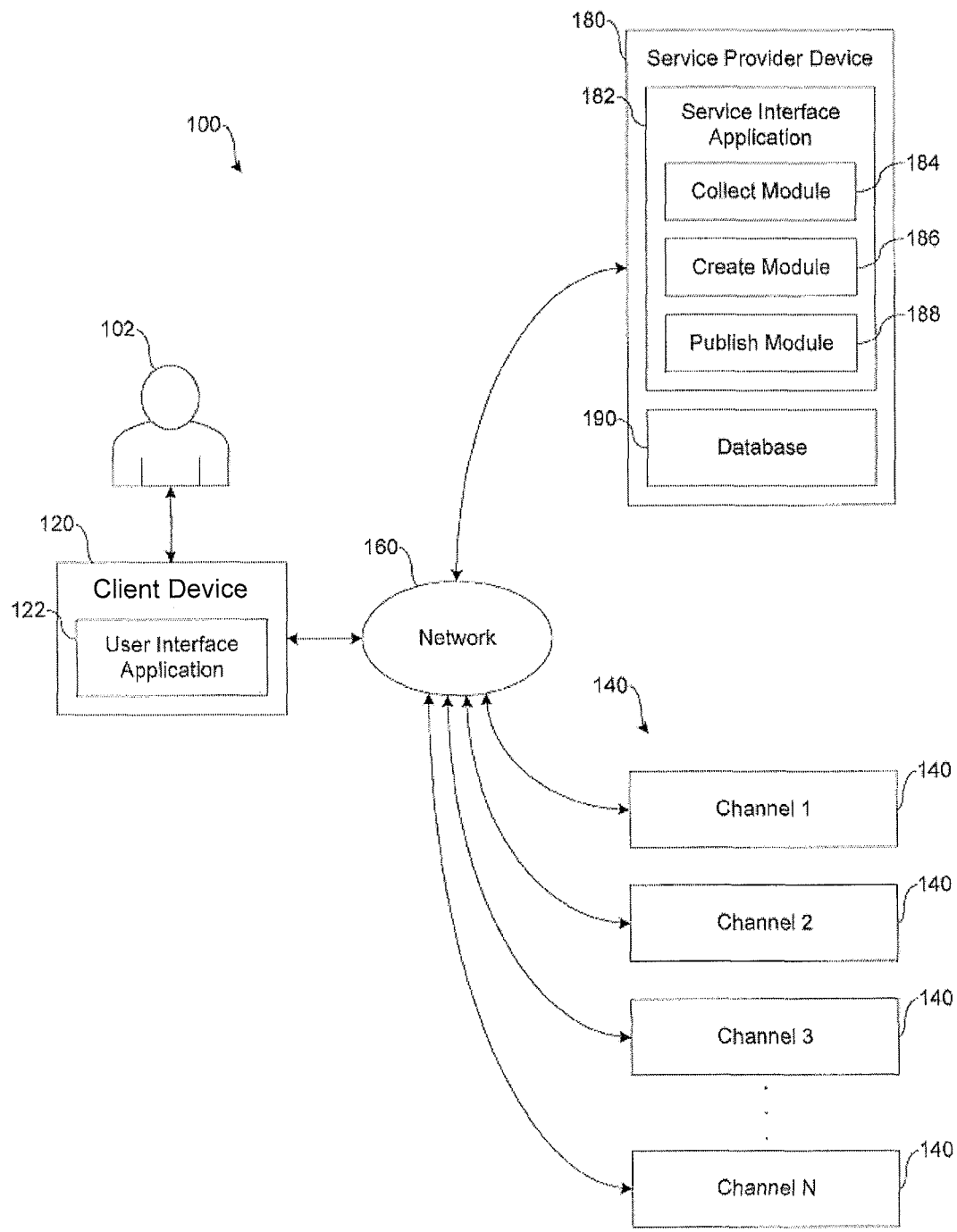
FIG. 1 illustrates a system configured to facilitate publishing and/or sharing media presentations over a network, in accordance with an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same. It is also noted that figures are not necessarily drawn to scale.

DETAILED DESCRIPTION

Systems and methods disclosed herein, in accordance with one or more embodiments, facilitate publishing, sharing and/or broadcasting multi-media presentations over a network for viewing by other users in communication with the network. In one embodiment, the multi-media presentation may be published or distributed to a site accessible via the network for viewing by one or more other network users in communication with the network. In another embodiment, the multi-media presentation may be directly emailed to one or more recipients (i.e., other network users). In still another embodiment, an associated URL link for the multi-media presentation may be given (e.g., via email or some type of text message) to one or more recipients (i.e., other network users) for direct access to the multi-media presentation. In yet another embodiment, source code for the multi-media presentation may be embedded in a web page via the network.

In accordance with one or more embodiments of the present disclosure, methods and apparatus are further provided for efficient, flexible, and user-friendly navigation of loaded media in a multi-media presentation over a network, such that a user may be able to view and/or edit the presentation, for example when sharing and/or broadcasting the presentation.

FIG. 1 shows one embodiment of a block diagram of a system 100 adapted to facilitate publishing, sharing and/or broadcasting multi-media presentations over a network 160. As shown in FIG. 1, the system 100 includes at least one client device 120 (e.g., a network computing device), one or more multi-media distribution channels 140 (e.g., network server devices), and at least one service provider device 180 (e.g., a network server) in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., a cellular phone network) adapted to communicate with other communication networks, such as the Internet. As such, in various embodiments, the at least one client device 120, the multi-media distribution channels 140, and the at least one service provider device 180 may be associated with a particular link (e.g., a link, such as a URL (Uniform Resource Locator) to an IP (Internet Protocol) address).

The at least one client device 120, in various embodiments, may be implemented using any appropriate combination of hardware, firmware, and/or software configured for wired and/or wireless communication over the network 160. In various implementations, the client device 120 may be implemented as a personal computing device (e.g., a personal computer (PC)) in communication with the network 160. In various other implementations, the client device 120 may be implemented as one or more wireless telephones (e.g., cell phones), personal digital assistants (PDAs), notebook computers, and/or various other generally known types of wired and/or wireless computing devices. It should be appreciated that the client device 120 may be referred to as a user device or a customer device without departing from the scope of the present disclosure.

The client device 120, in one embodiment, includes a user interface application 122, which may be utilized by a user 102 to conduct information transactions with the distribution channels 140 and the service provider device 180 over the network 160. For example, the user interface application 122 may be implemented as a multi-media presentation application to collect, create and publish information via the network 160. In various implementations, multi-media presentations may be published to and/or shared with one or more of the multi-media channels 140 via the user interface application 122 over the network 160.

In one implementation, the user interface application 122 comprises a software program, such as a graphical user interface (GUI), executable by a processor that is configured to interface and communicate with the multi-media channels 140 and the service provider device 180 via the network 160. In another implementation, the user interface application 122 comprises a browser module that provides a network interface to browse information available over the network 160. For example, the user interface application 122 may be implemented, in part, as a web browser to view information available over the network 160. In another example, the user 102 is able to access multi-media websites via the one or more multi-media channels 140 to view, collect and publish multi-media presentations over the network 160.

The client device 120, in various embodiments, may include other applications as may be desired in one or more implementations to provide additional features available to the user 102. In one example, such other applications may include security applications for implementing client-side security features, programmatic client applications for interfacing with appropriate application programming interfaces (APIs) over the network 160 or various other types of generally known programs and/or applications. In other examples, these other applications may interface with the user interface application 122 for improved efficiency and convenience. For example, files, data, and/or various types of information may be imported from multi-media software directly into the user interface application 122 for ease of access to multi-media files (e.g., audio, video, pictures, clip-art, etc.).

The client device 120, in various embodiments, may include a user identifier, which may be implemented, for example, as operating system registry entries, cookies associated with the user interface application 122, identifiers associated with hardware of the client device 120, or various other appropriate identifiers. The user identifier may include attributes related to the user 102, such as personal information (e.g., a user name, password, etc.). In one implementation, the user identifier may be passed to the service provider device 180 during publishing and/or sharing of a multi-media presentation.

The multi-media distribution channels 140, in one embodiment, may be maintained by one or more resource providers and/or entities (e.g., social networking sites, resource information sites, management sites, merchant sites, etc.) in communication with the network 160. As such, the multi-media distribution channels 140 may be implemented using any appropriate combination of hardware and/or software configured for wired and/or wireless communication over the network 160. In one implementation, the multi-media distribution channels 140 may be implemented as a network computing device (e.g., a network server) in wired and/or wireless communication with the network 160.

The service provider device 180, in one embodiment, may be maintained by an online transaction processing provider and/or entity in communication with the network 160. As such, the service provider device 180 may be implemented using any appropriate combination of hardware, firmware, and/or software configured for wired and/or wireless communication over the network 160. In one implementation, the service provider device 180 may be implemented as a network computing device (e.g., a network server) in wired and/or wireless communication with the network 160. As shown in FIG. 1, the service provider device 180 includes a service interface application 182, which may be adapted to interact with the client device 120 to facilitate publishing and/or sharing multi-media presentations over a network.

The service interface application 182, in one embodiment, utilizes a collect module 184, a create module 186, and a publish module 188 to collect information, create presentations, and publish presentations, respectively. As described in greater detail herein, the modules 184, 186, 188 enable users, such as the user 102, to collect diverse types of audio and visual media, create rich multi-media presentations with real-time editing and authoring using media software, such as Flash, and then share and/or publish the rich multi-media presentations with other users via the network 160. In one example, the collect, create, and publish modules 184, 186, 188 may be implemented within a standard web browser for interfacing with the user 102.

In one implementation, the user 102 is able to share multi-media presentations with other users via the media channels 140 and/or embed multi-media presentations directly in webpages of other users. For example, the user 102 may provide a unique URL link for the multi-media presentation to other users. In another example, the user 102 may directly email multi-media presentations to multiple recipients and include a message with the email. In still another example, the user 102 may provide the source HTML (i.e., HyperText Markup Language) code to other users and/or embed the source HTML code directly into other user's webpages. Still other examples include the ability to publish multi-media presentations on a website to sell a particular item or service for purchase. For items and/or services, a media rich presentation helps users market and sell items and/or services, which may be valuable for high-end or high-priced items and/or services. Social and/or dating sites may utilize these multi-media presentations to provide online users with a way to better present themselves to other online users. In various implementations, some types of webpages may be presented in a more dynamic manner by utilizing Rich Site Summary (RSS) feeds, since, for example, a particular user's presentation may be continually changed with new media.

The service provider device 180, in various embodiments, may be configured to maintain, store and/or archive multi-media presentations in a database 190, each of which may include information related to one or more users, such as the user 102, and one or more multi-media channels, such as multi-media distributions channels 140. In various examples, the multi-media presentations may include attributes stored as part thereof, and the attributes may be passed to the service provider device 180 as part of a creating, publishing and/or sharing of the multi-media presentations.

The collect module 184, in one embodiment, enables the user 102 to collect media objects, such as audio, photographic images, video, and music media from various sources, such as a PC, RSS feeds, websites, and any other online source, via a user interface, such as the user interface application 122. In various implementations, the user interface application 122 comprises multiple tabs and/or links for the various sources. Once collected, the media may be saved and categorized in the database 190 and edited on the system site via the service provider device 180. Editing may include one or more of sizing, rotating, overlying, moving and stacking various media backward and forward with an overlay or stack. In one example, video may be broken up automatically by the service provider device 180 into smaller segments, and selected video segments may be combined and/or used as desired. Selected media may be placed on a virtual storyboard, such as a clipboard, on the same screen as the collection of media. Media may be edited either in the collection or in the storyboard in one example. Placing desired media on the storyboard may be accomplished by dragging and dropping in another example. Thus, the collect module 184 provides selected media on a storyboard. In another example, the collect module 184 provides media on a user's media page (i.e., not placed on the storyboard). In still another example, uploading media may be delayed until editing is completed.

The create module 186, in one embodiment, enables the user 102 to place selected media onto a presentation style, board or collage. The service provider device 180 may automatically suggest a story idea to launch the creative process, or the user 102 may select a specific style or presentation tool. In one implementation, media from the storyboard may be dragged and dropped onto the presentation. Within the presentation, there may be multiple styles, such as a picture frame, a television, a billboard, etc. Media may be placed within the viewing window of each type of style. Once in the presentation, the media may be edited. For example, the media may be rotated, sized, cut-out (e.g., by selecting the boundaries of an image, such as with clicks to designate points along the boundary, enabling as coarse or fine a resolution as desired), moved forward or backward in relation to adjacent media, slid to add or remove spaces within the presentation, and edited to add a hotspot (e.g., selecting an area of the image for additional information, such as adding a link, video, text, etc.). Other editing features may include adding audio to the background, adding text, and/or distorting images. In one aspect, the editing may be achieved in real-time so that the user 102 may quickly and easily see the results and change them as needed.

The publish module 188, in one embodiment, enables the user 102 to share, publish and/or distribute the presentation when, for example, the presentation is completed. In one implementation, as described herein, the presentation may be saved in the database 190 of the service provider device 180. Once saved, the user 102 may share, publish and/or distribute presentations to any selected channel, such as one or more of the multi-media channels 140. Any users on the network 160 having access to the channels 140 or website related to the channels 140 may refresh the view, which may automatically load the presentation into that channel and/or website for viewing the content of the presentation. As such, the presentations may be distributed to various online websites, blogs, mobile video players, and IP TV networks, and/or on the system site.

These modules 184, 186, 188 may be combined, used, and/or modified to provide the user 102 with different initial choices regarding the type of presentation and features desired for creating the presentation. The choices may be a simple, easy-to-use tool to quickly build presentations with dynamic content from RSS feeds and online albums. Accordingly, the user 102 may select a presentation style and then link it to the user's media libraries through RSS feeds that maintain an "always on" permalink to the content source.

Figure 2A:
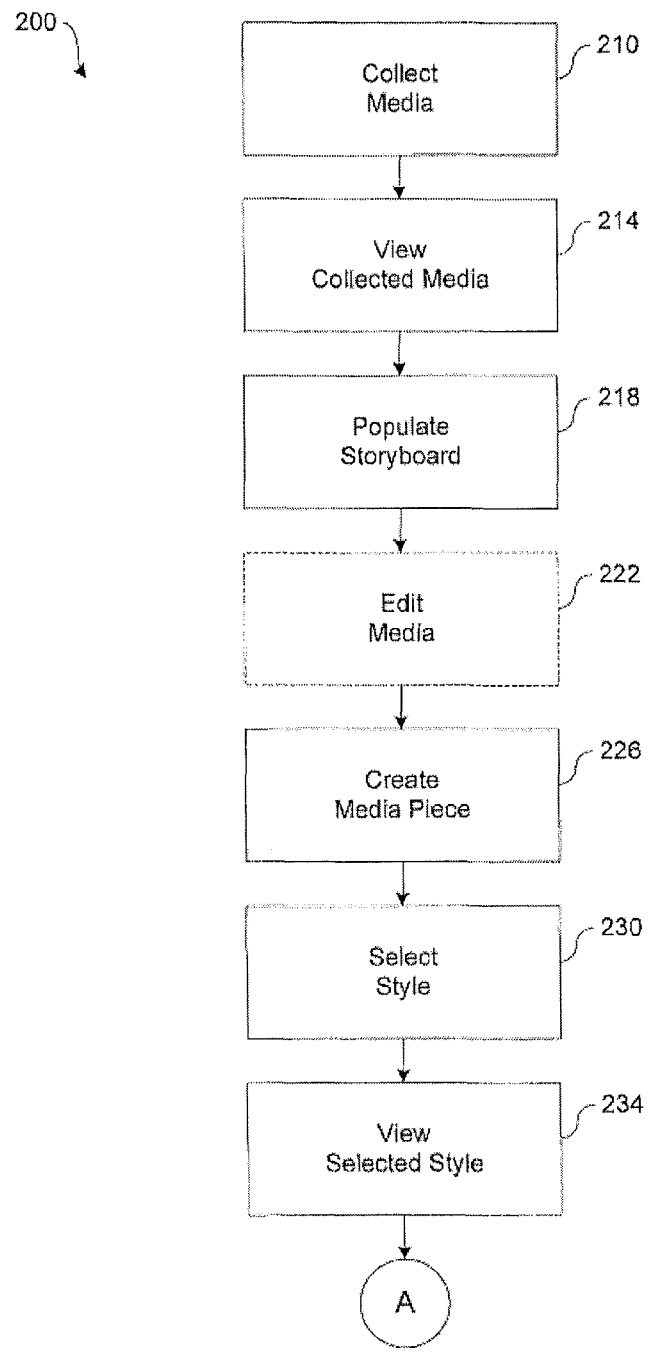
FIGS. 2A-2B illustrate a flow diagram of a method adapted to facilitate publishing and/or sharing multi-media presentations over a network, in accordance with an embodiment of the present disclosure.
Figure 2B:
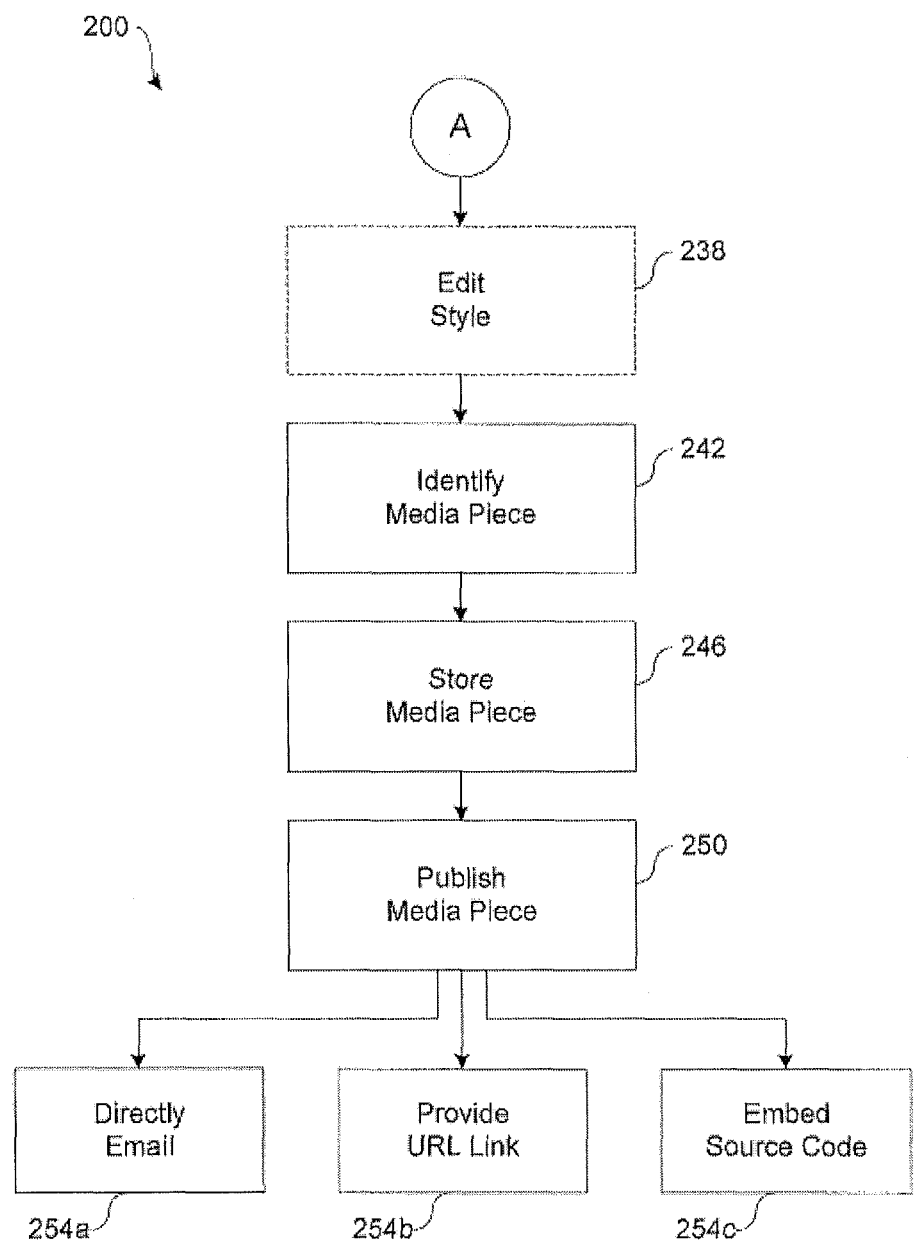

FIGS. 2A-2B show one embodiment of a block diagram of a method 200 adapted to facilitate creating, publishing and/or sharing multi-media presentations over the network 160, in reference to FIG. 1. It should be appreciated that the order of the following process flow may be rearranged without departing from the scope of the present disclosure.

Referring to FIG. 2A, the method 200 comprises collecting media for a multi-media presentation (block 210). In various implementations, media such as photographic images, audio, video, music, etc. may be collected from a variety of sources including local sources, such as a personal computer (PC), and online sources, such as the Internet, for use in the media presentation or media piece. For example, an online search engine may be accessed and one or more keyword searches may be utilized to search the Internet for various types of media content. In another example, additional media may be collected from other sources, such as media from a PC, which may be selected, uploaded and viewed. As such, media from different sources may be viewed by selecting corresponding media source tabs from the user interface application 122. Media may be viewed as individual media items or clustered such that each of the individual media items within the cluster may be viewed. In one aspect, the user interface application 122 interfaces with the service interface application 182 via the network 160 to utilize the collect module 186 for collecting media. In another aspect, any media collected may be displayed on the client device 120 via the network 160 for viewing by the user 102 in a media collection area of the user interface application 122 (block 214).

Next, the method 200 comprises populating a storyboard (block 218). In one implementation, the user interface application 122 includes a graphical storyboard, which may be populated with collected media from one or more of the media items or a cluster of media items collected from various media sources. For example, the graphical storyboard may include one or more images of items and/or clustered items collected from the Internet and items uploaded from a PC. In one example, media objects or items may automatically populate the storyboard. Further disclosure of automatic media population may be found in U.S. application Ser. No. 12/347,749, which has been previously incorporated by reference herein for all purposes Optionally, one or more of the media objects/items may be edited (block 222). In various implementations, media positioned on the graphical storyboard may be edited prior to generating the media presentation or media piece, and/or individual media items in a media cluster may be reordered.

Next, the media presentation or media piece may be created (block 226). In one implementation, once media objects have been collected and optionally edited, the media presentation or media piece may be created by selecting a creation operation of the user interface application 122. In one aspect, the user interface application 122 interfaces with the service interface application 182 via the network 160 to utilize the create module 186 for creating the media presentation or media piece.

In various implementations, creating the media presentation or media piece may include selecting and/or customizing its style (block 230) and viewing the selected and/or customized style (block 234). For example, presentation styles may include, but are not limited to, a picture frame, a billboard, kaleidoscope, a street scene, landscape, etc. Once a style is selected, media items from the storyboard may automatically flow into or populate the selected style. Some styles, such as kaleidoscope style, support movement of media as part of a presentation style and provides various customizable characteristics of movement, such as speed of media rotation, etc., within the style. In one aspect, the customized style may be displayed on the client device 120 via the network 160 for viewing by the user 102.

Next, referring to FIG. 2B, the selected and/or customized style of the media presentation or media piece may be optionally edited (block 238). In various implementations, if further editing of media presentation style is desired, style editing tools may be provided to the user interface application 122 via the create module 186. These editing tools may include the ability to preview the media presentation or media piece, edit the media presentation or media piece (e.g., scale, rotate and/or move frames directly onto the media presentation or media piece), add text and/or captions to the media presentation or media piece, add audio, sound, music and/or voice-over to the media presentation or media piece, place a frame and/or mask on the media presentation or piece, and add background images and/or color to the media presentation or media piece. For example, a sound feature may provide options, such as adding music to particular media or background, having the music vary in loudness depending on time and/or spatial indicators, and having a repeating playlist that repeats particular music and/or plays different segments in a random manner.

Next, the method 200 comprises providing identifying information (block 242) about the media presentation or media piece (e.g., a title, a storage location and/or various types of descriptive information) and deciding where to store the media presentation or media piece (block 246). In one implementation, the user 102 may identify and/or select one or more distribution channels located on an associated server for storage of the media presentation or media piece or choose an alternative storage location in the network 160.

Next, the method 200 comprises publishing, sharing and/or broadcasting the media presentation or media piece via the network (block 250). In various implementations, the media presentation or media piece may be published or distributed to a site accessible via the network 160 for viewing by one or more other network users in communication with the network 160. For example, the media presentation or media piece may be directly emailed (block 254*a*) to one or more recipients (i.e., other network users), along with a message. In another example, an associated URL link (block 254*b*) for the media presentation or media piece may be given (e.g., via email or some type of text message) to one or more recipients (i.e., other network users) for direct access to the media presentation or media piece via the network 160. In still another example, source code (block 254*c*) for the media presentation or media piece may be obtained by the user 102 and embedded into a web page managed by the user 102 via the network 160.

Accordingly, in various implementations, the user 102 may email the media presentation or media piece to other network users via the network 160, embed the media presentation or media piece in a web page that is accessible via the network 160, and/or create a URL permalink of the media presentation or media piece to one or more of the multi-media distribution channels 140 in the network 160.

In one implementation, the user interface application 122 and service interface application 182 allow users to compose multi-media stories and presentations by laying out media objects, such as photographic images, video, text and audio, on a medium, such as a stage or storyboard, which is displayable within a visual window. In one aspect, a multi-media story may begin from an unpopulated storyboard. The user 102 may select to view and work with a sample story until the user 102 is ready to begin the media story. Multi-media items from various sources may be viewed by selecting source tabs of the user interface application 122.

Once the user 102 is ready to create a media story, the user 102 accesses a collage storyboard. In one aspect, the storyboard or stage progressively moves in a first direction, such as a left or right (horizontal) direction, and when viewed, may appear as a movie adapted to present a linear narrative in time and/or space. In another aspect, the stage may progressively move in a second direction, such as an upward or downward (vertical) direction. Again, this type of movement may present a natural mapping to time, space, and/or narrative. In one example, the vertical orientation may represent physical structures that have height and/or depth, such as buildings, structures, monuments and/or geological strata. In still another aspect, the stage may be adapted to progressively move in a plurality of directions and may be presented as real or virtual spaces in two or three dimensions. Furthermore, the storyboard or stage may progressively move at different speeds based upon user input, for example via the turning speed of a mouse wheel, cursor movement along a slide tool, or cursor movement to a boundary of the visual window, as further described below. Thus, the present disclosure provides for multi-dimensional and variable speed navigation of the multi-media items presented on the collage storyboard.

In various implementations, multi-media items from various sources may be uploaded from the network 160, or previously collected media items may be used to populate the storyboard by selecting desired multi-media items. A multi-media item may be repositioned within the storyboard by selecting, dragging and dropping the multi-media item to another location in the storyboard. Similarly, a multi-media item may be removed from the storyboard by dragging and dropping the multi-media item from the storyboard. In one aspect, once multi-media items are positioned within the storyboard, the media story may be edited. In this regard, a rich interface may be presented to users within a predefined screen area or visual window.

In various embodiments, the service interface application 182 utilizes a number of innovative techniques to deal with the limited space of the screen area or visual window. For example, a first technique utilizes one or more direct-attached media-specific tools. When selecting any media object on the stage, a highlight rectangle appears around the object. Attached to the rectangle around the media object are a number of tools, some generic for all media types, others specific to the media type. By showing the tools in close proximity to the media object, it is easier for users to understand the relationship of the tool to the media object. For each tool, an edge may be specified (e.g., expressed as a number from 0-3, 0=top, 1=right, 2=bottom and 3=left), a position along the edge (e.g., expressed as a ratio of edge length) and an offset from the edge (e.g., expressed as a factor of the tool's size). Whenever updating a position of a tool, an absolute position may be calculated or recalculated based on various parameters.

In another example, an embodiment utilizes a rotation invariant display of tools. If a user 102 rotates a media object using a rotate tool, the associated tools remain fixed to the original object constraint point (i.e., they do not rotate, thereby making it easier for the user to read the icons). Once a rotation is complete, the attached edge is calculated or recalculated based on the perceived edge, and if necessary fades the tool out from a previous location to a new location. As such, the user 102 may be accustomed to finding certain tools in certain positions relative to a media object, irrespective of the media object's rotation.

In another example, an embodiment utilizes a slide tool. When working with media that may progressively move in a particular direction, user selection and manipulation of individual media objects may become a challenge. Traditional techniques of multiple selection and direct manipulation may break down when dealing with large numbers of media objects or large documents. The slide tool allows the user 102 to perform an action that may be difficult, such as insert or remove horizontal space within a collage or story. The user 102 selects a media object to reveal the media specific tools. The slide tool is affixed to an edge of the media object, and when grabbed, the slide tool selects one or more media objects at or to the other edge of the selected media object, and allows side-to-side sliding during a user action. In one aspect, this technique may be utilized for a vertically oriented collage or story, which would present the slide tool on an upper edge of the selected media object and allow dragging of layers at or below the selected object.

In another example, an embodiment utilizes a drag and drop insertion. The user 102 may drag thumbnails representing media objects from a media tab and drop them onto the stage or storyboard. As the user 102 drags the thumbnail over the stage or storyboard, an insertion point indicator is presented to the user 102 showing where an edge of the dropped item may be located during user action, such as, if the user's mouse is released. If the user's mouse hovers over the left edge of an existing media object on the stage, the indicator state switches to an insert mode. If the user releases the mouse while the indicator is in this mode, the underlying media object and all media objects to the right of the left edge of that media object will be offset to the right to allow for the dropped media object to fit on the stage without being obscured.

In another example, an embodiment utilizes one or more unconstrained animated button icons. Some applications use iconic images to represent actions that the user 102 may perform. As icons become smaller, they are difficult to discern and understand. The service interface application 182 uses animation and unbounded icons to convey visual information in one embodiment. In one aspect, a text tool icon in an idle state is an "A" (other applications often use a T as the text tool). On rollover, the A is revealed to be a window onto a cropped, sliding Add Text message, which animates to an edge. In another aspect, a soundtrack tool may be represented as a musical note, but on rollover, the notes play and rise outside of a representative button. To create these buttons, a designer may designate a static rectangle, which represents traditional bounds of the graphic. These bounds may be used by the button to determine the button bounds and scale. Graphic icon content is not restricted to lie within these bounds and the button class is set to not clip its content. By triggering the animation on rollover, the design may exceed its bounds, while still preserving visual coherence in the idle state.

In another example, an embodiment utilizes one or more collapsible tabbed containers. When editing a collage or story, a button bar may represent one or more additional editing options. The collapsed bar may comprise a row of buttons, although each icon may be presented as a button rather than an icon. When the user 102 selects at least one of the buttons, the selected button transforms into a tab, and the bar expands horizontally to include the tab content. The user 102 may collapse the bar by selecting a close button in the bar or by selecting the currently open tab.

In another example, the user 102 may add one or more hotspots to the media presentation or piece. A hotspot may be identified by a title as a cursor is moved over a designated hotspot area. Activating the hotspot by selecting the hotspot area may link the user 102 to additional information relating to the hotspot item. For example, if an automobile is used as a media item within the collage storyboard, a hotspot may link the user 102 to additional information relating to the automobile, such as price, condition, and terms or sale. Hotspots may be specific to one part or element of the media item. In this example, the user 102 may create a hotspot on the tire, which, when opened, may give the viewer access and/or information on the tire, where to buy the tire, etc. Other hotspots may link the user to music or other audio clips, and other media may be uploaded into the collage storyboard from a clipboard or link to sale items posted on the Internet. Once the media piece has been created the media piece may be viewed, saved, previewed and/or published. Once published, the user 102 may have options as to the playback. For example, the media presentation or piece may play continuously until stopped, play only for a specified number of times, play only once, etc. Further disclosure of hotspots may be found in U.S. application Ser. No.

12/347,638, which has been previously incorporated by reference herein for all purposes.

In another example, an embodiment utilizes innovative methods and apparatus for on-demand loading of media as further described below with respect to FIGS. 3-5B. Once a media presentation has been created and saved, the presentation can be edited or viewed, which requires loading of the media to a user interface application, such as a media player. A media presentation may be represented as a collage document with a plurality of layers. Each layer may include various layer-specific attributes, including but not limited to a position in the collage document, scale, visual bounds, associated annotations (i.e., hotspots), and an associated media object or a target media asset, which may have further layer-specific properties, such as playback behaviors. When a client device (e.g., client device 120) or a user interface application (e.g., a user interface application 122, a media player, etc.) loads a media presentation (e.g., a collage document or story), the user interface application first specifies a maximum number of layers per page of the desired collage document and requests the first page of the collage document. The request is made to the source of the collage document, and in one example can be made to a service provider device or a distribution channel server via a network, a website, or within a user device itself if the collage document has been saved to the user device. In the case of the service provider device 180 (e.g., a server) being the source of the collage document, the service provider device 180 returns up to a page worth of layers, sorted by position in the collage (e.g., a horizontal, or a vertical location). The user interface application may load one or more pages of layers from the presentation source and create a list of layers indexed by at least a position within the collage document. Then, the user interface application filters the layers down to the currently visible within the visual window of the user interface application. For each layer, if the layer hasn't already been loaded or queued for loading, the layer is queued for loading.

Figure 3:
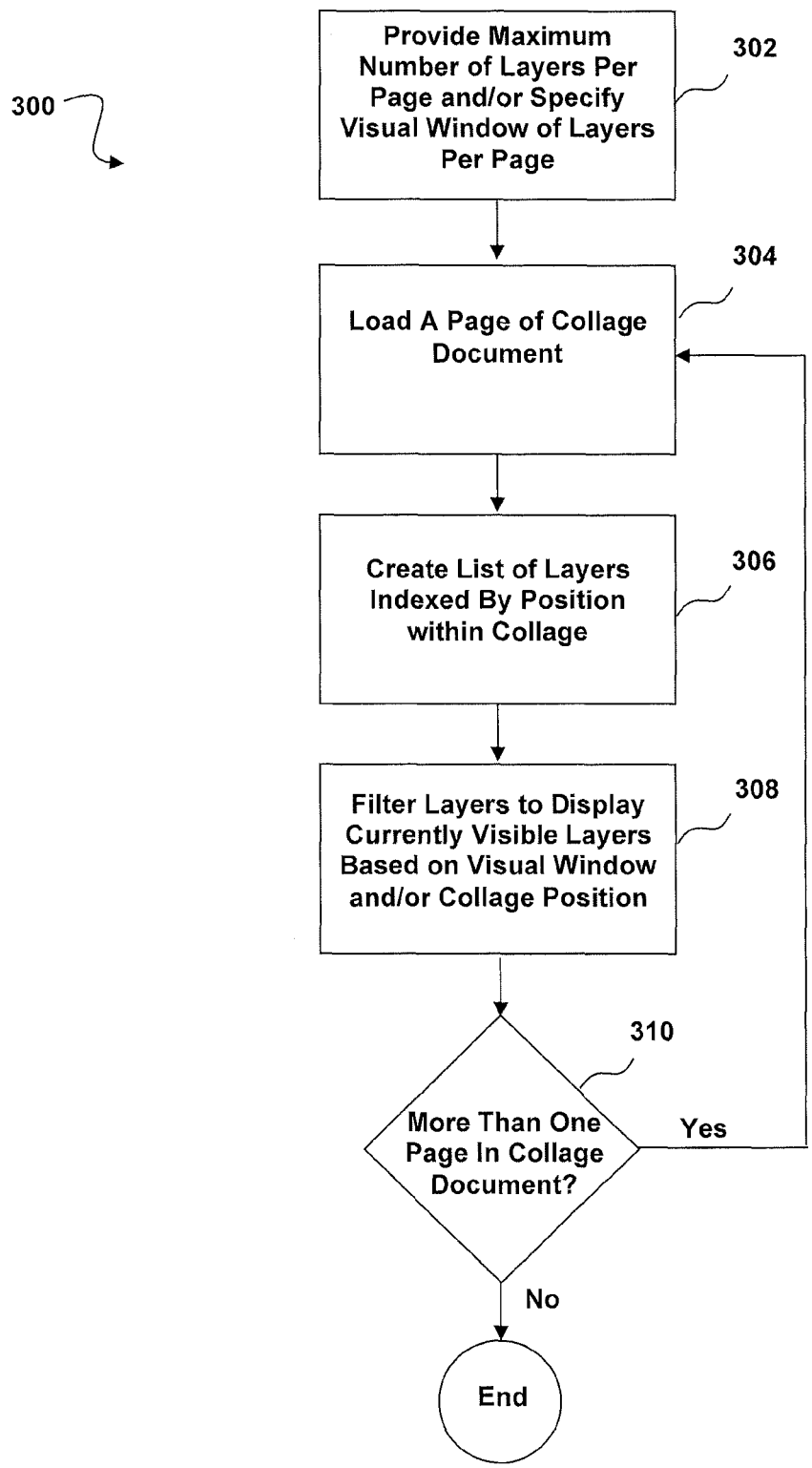
FIG. 3 illustrates a flow diagram of a method for loading media onto a client device in accordance with an embodiment of the present disclosure.

Referring now to FIG. 3, a flow diagram of a method 300 for loading media via a client device is illustrated in accordance with an embodiment of the present disclosure. As noted above, a collage document includes at least one page having a plurality of layers. Each layer is associated with a media object, and may further include layer-specific attributes, such as a position in the collage document, scale, visual bounds, and an associated annotation. As noted above, the collage document may flow in a linear two-dimensional fashion or may flow in various directions. Thus, a layer-specific attribute of the position in the collage document can include one of a horizontal position, a vertical position, a position along a line, a position in an area, and combinations thereof. The collage document may further comprise identity information including at least one of a title, a storage location, and a description, thus allowing for requests of particular collage documents.

At step 302, a client device provides a maximum number of layers per page of a collage document, and loads a first page of the collage document to the client device at step 304. Specifying the maximum number of layers per page thus allows for control over bandwidth and/or processing requirements if the page of layers is being downloaded over a network or when loading the collage document from within the client device. The maximum number of layers per page may be provided manually by a user through a user interface or automatically by the client device, such as via a client device processor. In other embodiments, the user or the client device can specify (manually or automatically) a maximum number of layers within a pre-determined or initial visual window of the user interface per page of the collage document ("the visual window of layers per page") in combination with a specification of the maximum number of layers per page or alone to further control for bandwidth and/or processing requirements when loading a collage document.

After loading the page of layers, the client device creates a list of layers of the loaded page at step 306, with each layer indexed by at least a position in the collage document. At step 308, the list of layers is filtered based on at least the position in the collage document and the visual window of the user interface to thereby display visible layers of the loaded page within the visual window.

At step 310, the client device determines if there is more than one page worth of layers in the collage document. If yes, the client device loads another page of the collage document as noted by the process loop back to step 304. If no, the client device finishes the loading process of the collage document.

As noted above, method 300 is applicable when loading a collage document to the client device from various sources, including a server device or a website via a network, and within the client device itself when a collage document is stored within a client device memory.

Figure 4:
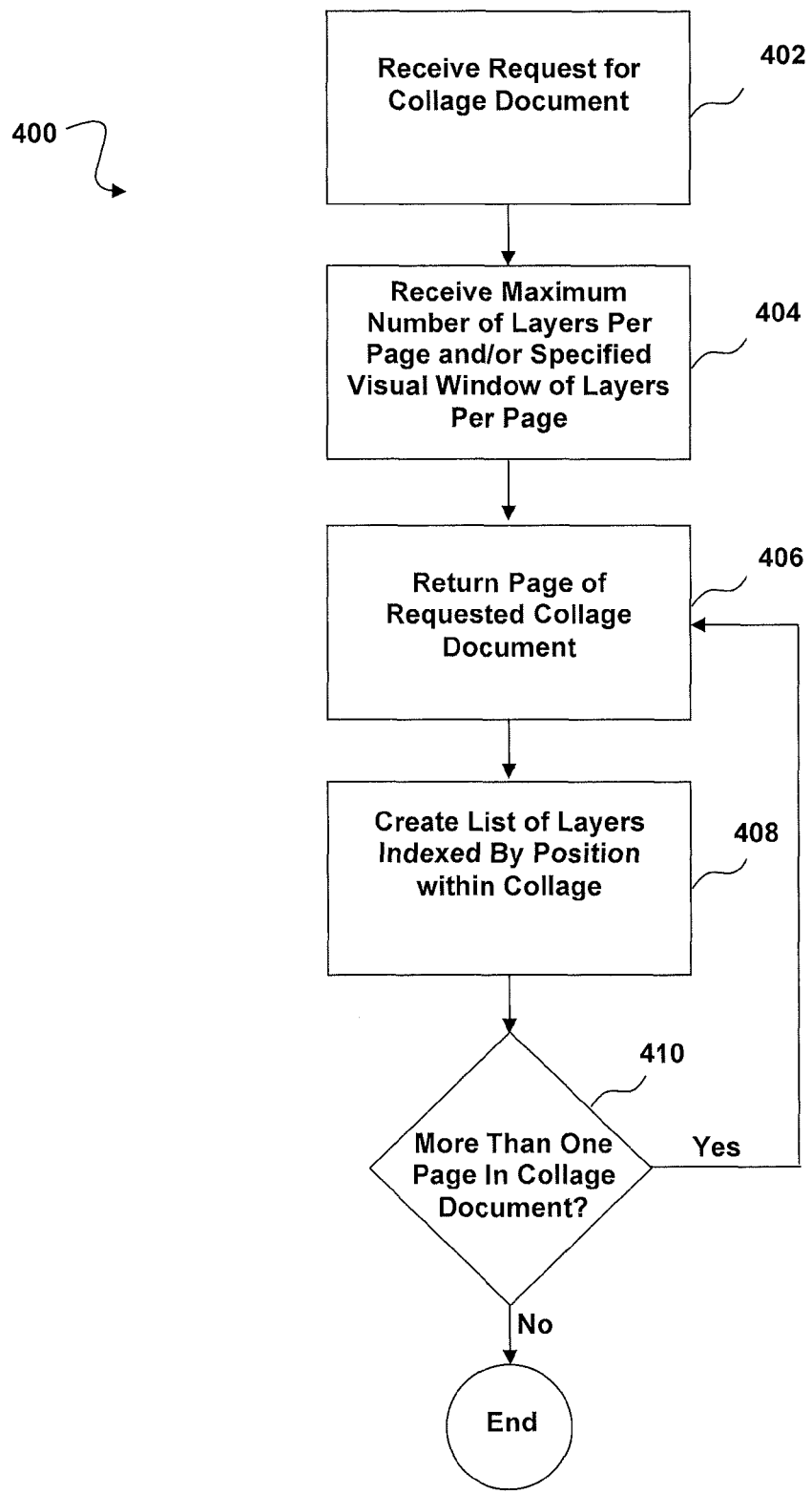
FIG. 4 illustrates a flow diagram of a method for loading media from a server device in accordance with an embodiment of the present disclosure.

Referring now to FIG. 4, a flow diagram is illustrated of a method 400 for loading media from a server device in accordance with an embodiment of the present disclosure. The server device can store a collage document in a database or have access to a database storing the collage document remotely from the server device in one embodiment.

At step 402, the server device receives a request for a collage document, the collage document including at least one page having a plurality of layers, with each layer being associated with a media object as noted above. Other attributes of a collage document noted above apply in this process as well and will not further described. At step 404, the server device receives a maximum number of layers per page of the collage document (from a client device), and as noted above, in other embodiments, may receive a visual window of layers per page alone or in conjunction with the maximum number of layers per page. At step 406, the server device returns a page of the requested collage document. Although the client device may create a list of layers of a loaded page as noted above, the server device may create a list of layers of the returned page in one embodiment, with each layer indexed by at least a position in the collage document, as at step 408. At step 410, the server device determines if there is more than one page worth of layers in the collage document. If yes, the server device returns another page of the collage document as noted by the process loop back to step 406. If no, the server device finishes the returning process of the collage document.

Figure 5A:
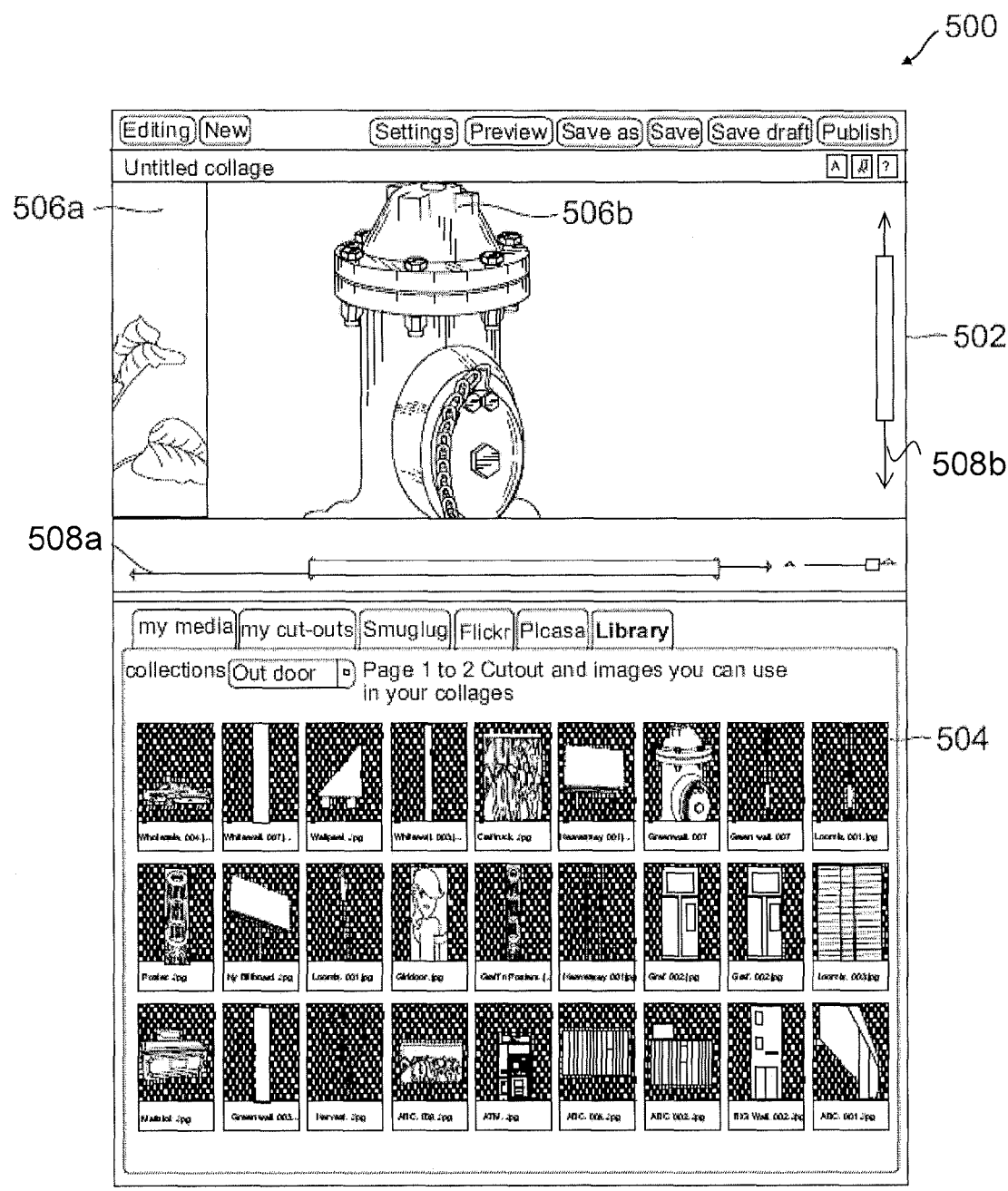
FIGS. 5A and 5B are screen shots of a user interface illustrating a visual window for loaded media in accordance with an embodiment of the present disclosure.
Figure 5B:
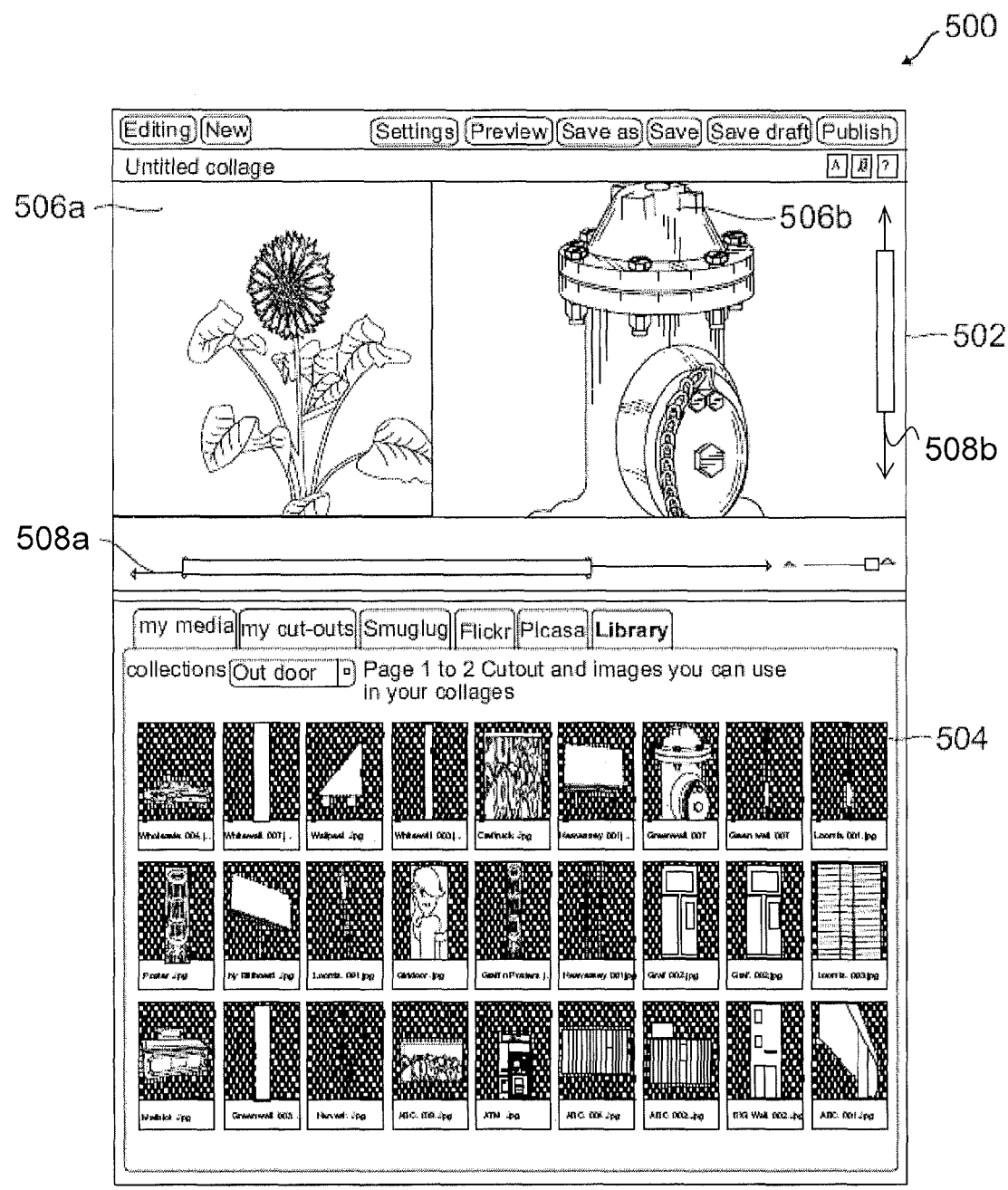

FIGS. 5A and 5B are screen shots of a user interface 500 of a client device for creating and/or editing loaded media in accordance with an embodiment of the present disclosure. User interface 500 includes a visual window 502 for viewing a storyboard or a stage, a media storage area 504, and slide tools 508a, 508b. Media objects 506a and 506b are placed within the storyboard and may be considered individual layers of a page of a collage document. A list of layers including media objects 506a and 506b is filtered based on at least the position in the collage document (determined by the layer collage position and slide tool) and the visual window of the user interface to thereby display visible layers of the loaded page within the visual window. As slide tool 508a is moved horizontally toward media object 506a and away from media object 506b, media object 506a is fully displayed, as shown in FIG. 5B. Slide tool 508b allows for navigation of media objects in a vertical direction. In other embodiments, it is possible that the storyboard or stage may be "grabbed" by the user via a user interface, such as a mouse, and the storyboard or stage navigated in any desired direction.

Figure 7:
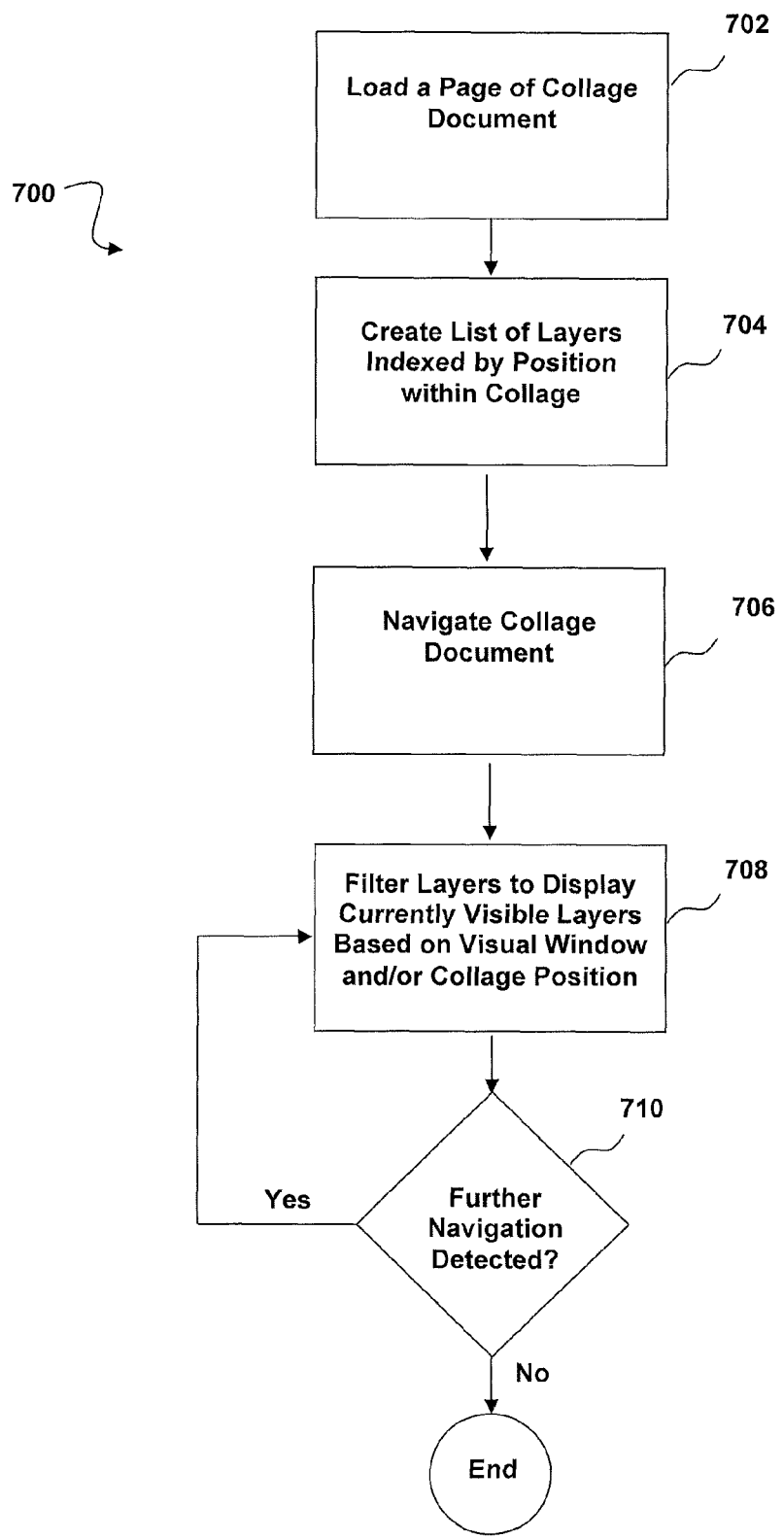
FIG. 7 illustrates a flow diagram of a method of navigating loaded media in accordance with an embodiment of the present disclosure.

Referring now to FIG. 7 in conjunction with FIGS. 5A-5B, a flow diagram of a method 700 for navigating loaded media via a client device is illustrated in accordance with an embodiment of the present disclosure. As noted above, a collage document includes at least one page having a plurality of layers. Each layer is associated with a media object, and may further include layer-specific attributes, such as a position in the collage document, scale, visual bounds, and an associated annotation.

At step 702, a page of layers is loaded onto a client device in a similar manner as described above with respect to FIGS. 3 and 4. The client device creates a list of layers of the loaded page at step 704, with each layer indexed by at least a position in the collage document. At step 706, the multimedia objects of the collage document are navigated by user input via a user interface, such as a mouse, display, and/or slide tool (e.g., slide tools 508a, 508b). The multi-media objects may flow in a linear two-dimensional fashion or may flow in various directions and the present disclosure allows for multi-directional and variable speed navigation of the multi-media utilizing the layer-specific attributes of the media object, such as position in the collage document which can include one of a horizontal position, a vertical position, a position along a line, a position in an area, and combinations thereof. At step 708, the list of layers is filtered based on at least the position in the collage document and the visual window of the user interface to thereby display visible layers of the loaded page within the visual window. At step 710, the client device determines if further navigation of the collage document is detected and if yes, the client device loops back to step 708 to filter the layers based on the position in the collage document and the visual window of the user interface. It is noted that if there is more than one page worth of layers in the collage document, the client device loads another page of the collage document.

As noted above, method 700 is applicable when navigating a loaded collage document from various sources, including a server device or a website via a network, and within the client device itself when a collage document is stored within a client device memory.

Furthermore, as noted above, the storyboard or stage may progressively move at different speeds based upon user input, for example via the turning speed of a mouse wheel, cursor movement along a slide tool (e.g., slide tools 508a, 508b), or cursor movement toward a boundary of the visual window 502 (e.g., faster movement in the direction of cursor movement as the cursor is moved closer to a visual window boundary or edge). Thus, the present disclosure provides for multi-dimensional and variable speed navigation of the multi-media items presented on the collage storyboard.

In various implementations, using the various media creation and publishing tools described herein, a user 102 may quickly and easily create media rich presentations and use (e.g., display, share, edit . . . etc.) those presentations in numerous ways. Some examples include the ability to publish a presentation on a site to sell a particular item or service. For items or services, a media rich presentation may assist the seller with marketing and selling the item or service, which may be valuable for high-end or high-priced items or services. Sellers may be able to cross sell or promote items or services or direct consumers to partner commercial sites using the hotspot feature. Social or dating sites may use these presentations to give its users a meaningful way to present themselves to others. Blogs and personal pages may be more dynamic using RSS feeds, since, for example, a particular user's presentation may be continually changing with new media.

Figure 6:
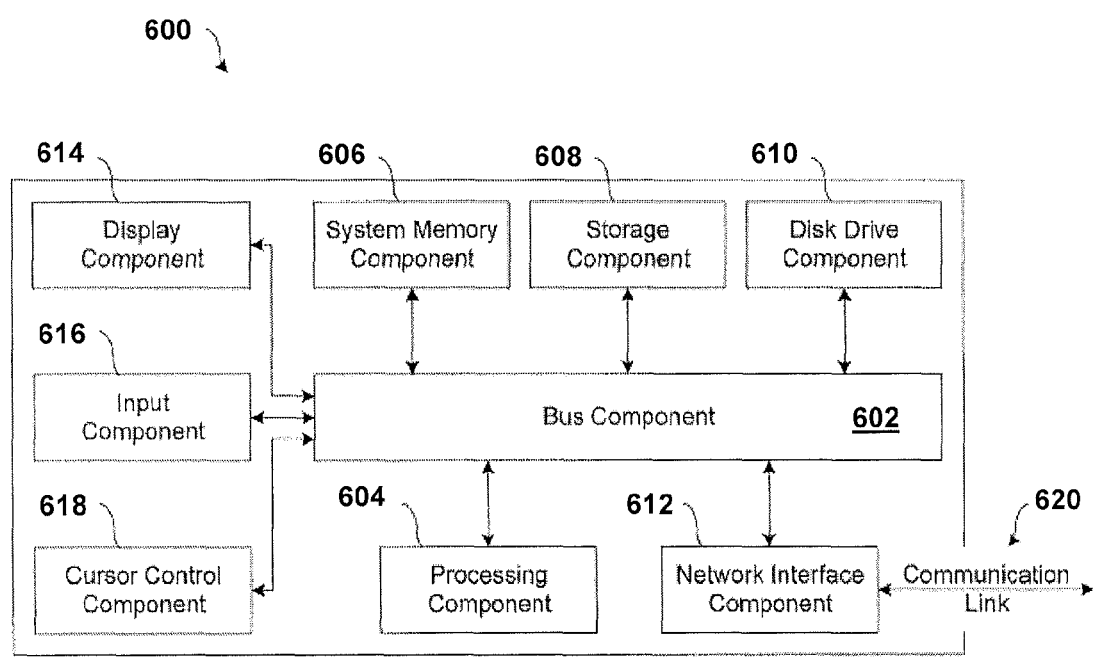
FIG. 6 is a block diagram of a computer system suitable for implementing one or more embodiments of the present disclosure.

Referring now to FIG. 6, a block diagram is illustrated of a computer system 600 suitable for implementing one or more embodiments of the present disclosure, including the client device 120, the one or more distribution channels 140, and the service provider device 180 (e.g., a server). In various implementations, the client device 140 may comprise a personal computing device capable of communicating with the network 160, such as a personal computer, laptop, cell phone, PDA, etc., the one or more distribution channels 140 (e.g., merchant devices) may comprise a network computing device, such as a network server, and the service provider device 180 may comprise a network computing device, such as a network server. Hence, it should be appreciated that each of the devices 120, 140, 180 may be implemented at least in part by computer system 600 in a manner as follows.

In accordance with various embodiments of the present disclosure, computer system 600, such as a personal computer and/or a network server, includes a bus 602 or other communication mechanism for communicating information, which interconnects subsystems and components, such as processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., CRT or LCD), input component 616 (e.g., keyboard), and cursor control component 618 (e.g., mouse or trackball). In one implementation, disk drive component 610 may comprise a database having one or more disk drive components.

In accordance with embodiments of the present disclosure, computer system 600 performs specific operations by processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of or in combination with software instructions to implement the present disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, non-volatile media includes optical or magnetic disks, such as disk drive component 610, volatile media includes dynamic memory, such as system memory component 606, and transmission media includes coaxial cables, copper wire, and fiber optics, including wires that comprise bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice embodiments of the present disclosure may be performed by computer system 600. In various other embodiments of the present disclosure, a plurality of computer systems 600 coupled by communication link 620 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

In one embodiment, a client device for loading media comprises a network interface configured to allow communication between the client device and a server device over a network, and a processor configured to provide a maximum number of layers per page of the collage document. The processor is further configured to load a first page of the collage document, create a list of layers of the loaded page, each layer indexed by at least a position in the collage document, and filter the list of layers based on at least the position in the collage document and a visual window of the user interface to thereby display visible layers of the loaded page within the visual window.

In another embodiment, a server device for loading media comprises a database for storing a collage document, and a network interface configured to allow communication between a client device and the server device over a network. The server device further includes a processor configured to: receive a request from the client device for the collage document for download, receive a maximum number of layers per page of the collage document, and return a page of the requested collage document.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving, via a communication interface of a client device, a request to display a visual window of a collage document having a plurality of pages, wherein the collage document comprises a plurality of layers on each of the plurality of pages, and wherein each of the plurality of layers is associated with an individual media object;
   determining displayable layers in the visual window from the plurality of layers of the collage document based on at least one page of the collage document for display in the visual window;
   receiving, from the client device, user selection of a first maximum number of layers presentable within the visual window on the client device via a media presentation module of the client device;
   determining a limit on bandwidth usage set for the client device, wherein the limit on bandwidth usage specifies a second maximum number of layers of the collage document receivable by the client device;
   determining a largest of the first maximum number of layers and the second maximum number of layers;
   filtering the displayable layers of the collage document based on the largest of the first maximum number of layers and the second maximum number of layers to retrieve a portion of the displayable layers, wherein the portion of the displayable layers is less than all of the plurality of layers; and
   causing to be displayed, via an output display device of the communication device, the portion of the displayable layers on the client device.

2. The method of claim 1, wherein the collage document is navigable on the client device in a plurality of directions, including one of a horizontal direction, a vertical direction, or a combination thereof, based on user input via a user interface.

3. The method of claim 1, wherein the collage document is navigable on the client device at a variable speed based on user input via the input device.

4. The method of claim 1, wherein the collage document comprises identity information including at least one of a title, a storage location, and a description.

5. The method of claim 1, wherein each of the plurality of layers comprises information for at least one of a position in the collage document, scale, visual bounds, or an associated annotation.

6. The method of claim 5, wherein the position in the collage document is at least one of a horizontal position, a vertical position, a position along a line, or a position in an area.

7. The method of claim 1, further comprising:
   requesting the collage document from a server device; and
   downloading the collage document to the client device via a network.

8. The method of claim 1, further comprising:
requesting the plurality of layers of the collage document from a server device; wherein the plurality of layers comprises the portion of the collage document.

9. A client device comprising:
a network interface; and
a processor configured to:
receive, via a communication interface of the client device, a request to display a visual window of a collage document having a plurality of pages, wherein the collage document comprises a plurality of layers on each of the plurality of pages, and wherein each of the plurality of layers is associated with an individual media object;
determine displayable layers in the visual window from the plurality of layers of the collage document based on at least one page of the collage document for display in the visual window;
receive, from the client device, user selection of a first maximum number of layers presentable within a visual window on the client device via a media presentation module of the client device;
determine a limit on bandwidth usage set for the client device, wherein the limit on bandwidth usage specifies a second maximum number of layers of the collage document receivable by the client device;
determine a largest of the first maximum number of layers and the second maximum number of layers;
filter the displayable layers of the collage document based on the largest of the first maximum number of layers and the second maximum number of layers to retrieve a portion of the displayable layers, wherein the portion of the displayable layers is less than all of the plurality of layers; and
cause to be displayed, via an output display device of the communication device, the portion of the displayable layers on the client device.

10. The client device of claim 9, wherein the collage document is navigable on the client device in a plurality of directions, including one of a horizontal direction, a vertical direction, or a combination thereof, based on user input via a user interface.

11. The client device of claim 9, wherein the collage document is navigable on the client device at a variable speed based on user input via the input device.

12. The client device of claim 9, wherein the collage document comprises identity information including at least one of a title, a storage location, or a description.

13. The client device of claim 9, wherein each of the plurality of layers comprises information for at least one of a position in the collage document, scale, visual bounds, or an associated annotation.

14. The client device of claim 13, wherein the position in the collage document is at least one of a horizontal position, a vertical position, a position along a line, or a position in an area.

15. The client device of claim 9, wherein the processor is further configured to:
request the collage document from a server device; and
download the collage document to the client device via a network.

16. A non-transitory computer-readable medium comprising executable modules which, in response to execution by a computer system, cause the computer system to perform a method comprising:
receiving, via a communication interface of a client device, a request to display a visual window of a collage document having a plurality of pages, wherein the collage document comprises a plurality of layers on each of the plurality of pages, and wherein each of the plurality of layers is associated with an individual media object;
determining displayable layers in the visual window from the plurality of layers of the collage document based on at least one page of the collage document for display in the visual window;
receiving, from the client device, user selection of a first maximum number of layers presentable within the visual window on the client device via a media presentation module of the client device;
determining a limit on bandwidth usage set for the client device, wherein the limit on bandwidth usage specifies a second maximum number of layers of the collage document receivable by the client device;
determining a largest of the first maximum number of layers and the second maximum number of layers;
filtering the displayable layers of the collage document based on the largest of the first maximum number of layers and the second maximum number of layers to retrieve a portion of the displayable layers, wherein the portion of the displayable layers is less than all of the plurality of layers; and
causing to be displayed, via an output display device of the communication device, the portion of the displayable layers on the client device.

* * * * *